(12) United States Patent
LaVelle

(10) Patent No.: US 8,721,818 B2
(45) Date of Patent: May 13, 2014

(54) METHOD AND APPARATUS FOR TOXIC SUBSTANCE ENCAPSULATION

(76) Inventor: Scot LaVelle, Rocky Face, GA (US)

( * ) Notice: Subject to any disclaimer, the term of this patent is extended or adjusted under 35 U.S.C. 154(b) by 298 days.

(21) Appl. No.: 13/183,408

(22) Filed: Jul. 14, 2011

(65) Prior Publication Data

US 2012/0027975 A1 Feb. 2, 2012

Related U.S. Application Data

(60) Provisional application No. 61/364,672, filed on Jul. 15, 2010.

(51) Int. Cl.
*E04F 13/07* (2006.01)
*B29C 65/52* (2006.01)
*B32B 37/00* (2006.01)
*B32B 38/04* (2006.01)
*B32B 43/00* (2006.01)

(52) U.S. Cl.
USPC .............................. 156/71; 156/252; 156/314

(58) Field of Classification Search
USPC ............ 156/71, 247, 249, 250, 252, 289, 314
See application file for complete search history.

(56) References Cited

U.S. PATENT DOCUMENTS

| 4,632,790 A | 12/1986 | Bernard |
| 4,681,785 A * | 7/1987 | Horn ............................... 428/43 |
| 6,666,938 B1 * | 12/2003 | Murphy et al. ................. 156/71 |
| 2004/0068247 A1* | 4/2004 | Connor ......................... 604/387 |
| 2005/0247011 A1 | 11/2005 | Hansen |

FOREIGN PATENT DOCUMENTS

| JP | 2011-128259 A | 5/1999 |
| JP | 2000-155194 A | 6/2000 |

* cited by examiner

*Primary Examiner* — Sing P Chan
(74) *Attorney, Agent, or Firm* — Keith Swedo

(57) ABSTRACT

A method of encapsulating a toxin on a contaminated surface includes providing a plastic air-tight substrate having first and second opposing surfaces. An adhesive substance is disposed on the first surface. The first surface of the plastic substrate is applied to the contaminated surface such that the plastic substrate is adhered to the contaminated surface, and such that the toxin is completely covered by the plastic substrate.

15 Claims, 15 Drawing Sheets

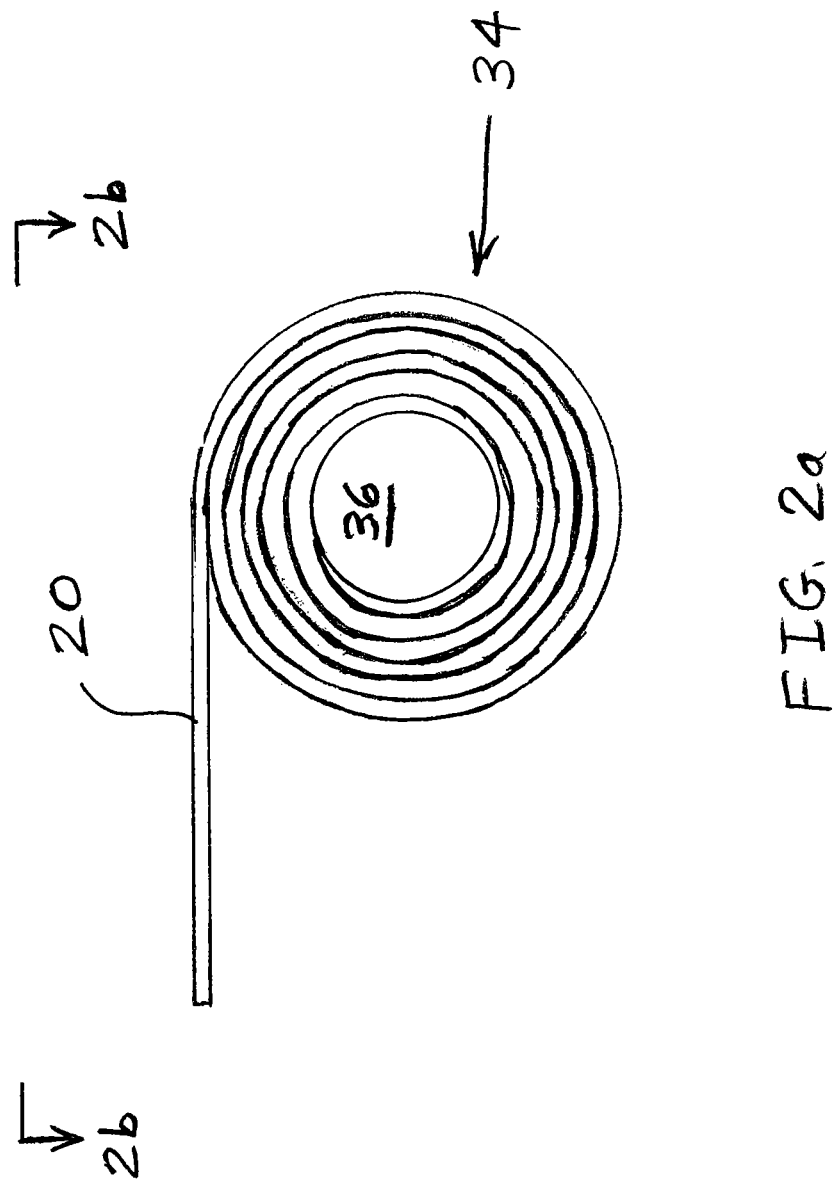

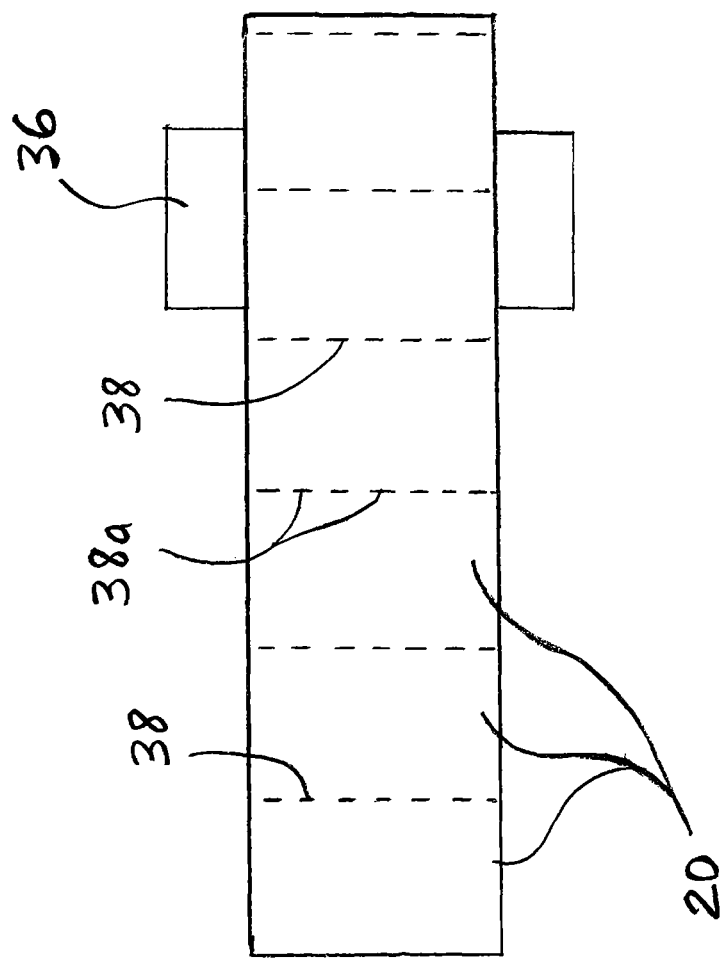

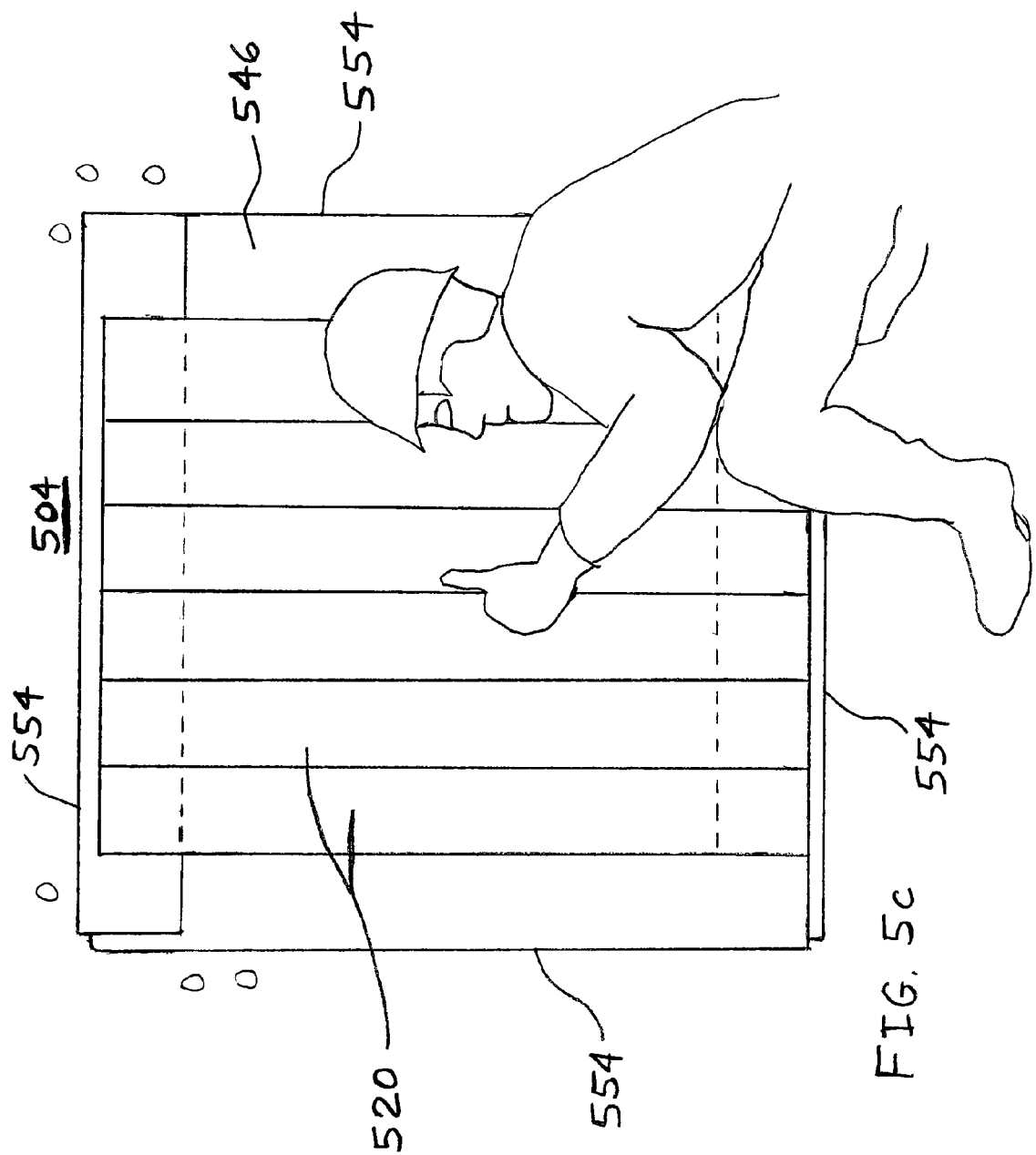

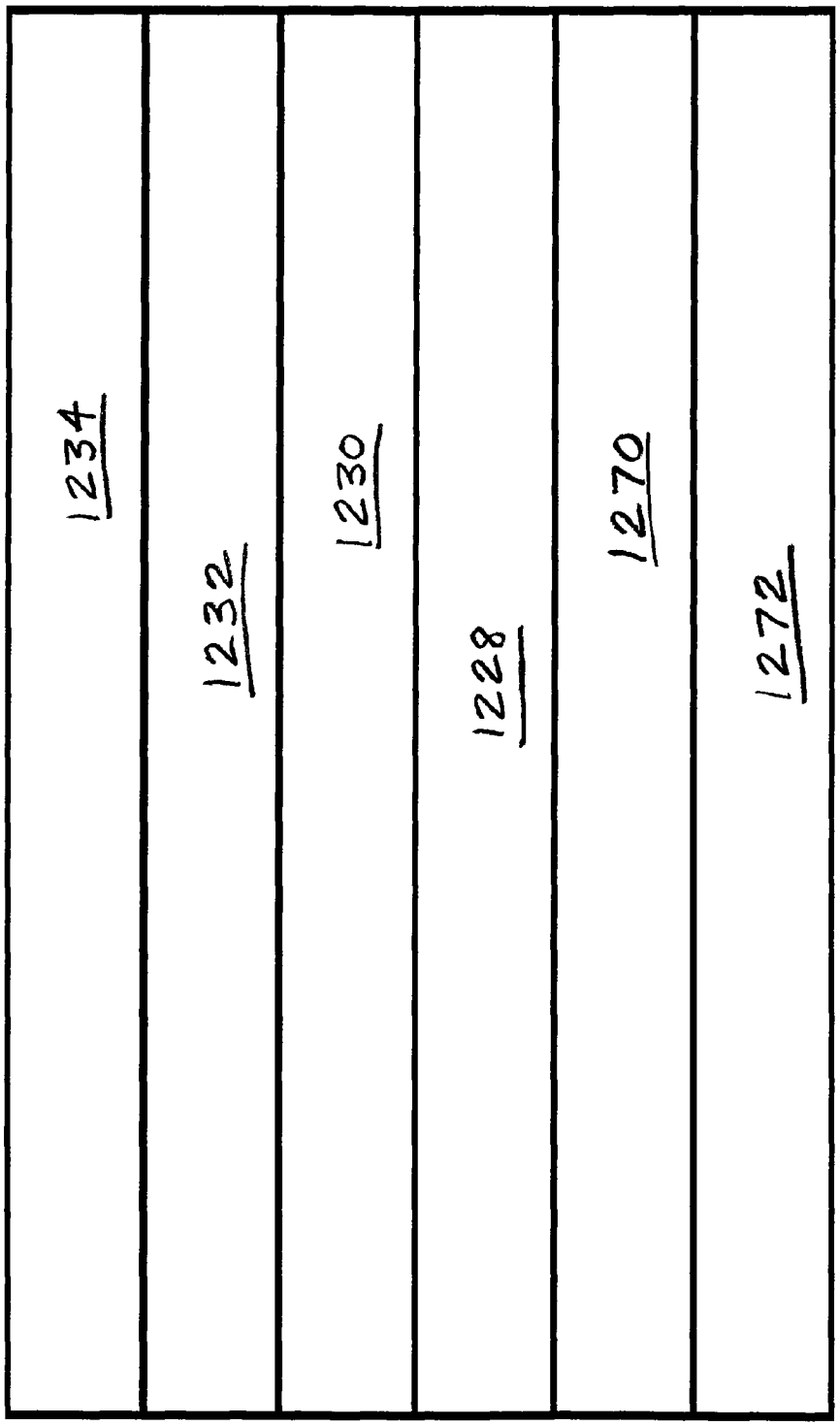

METHOD AND APPARATUS FOR TOXIC SUBSTANCE ENCAPSULATION

RELATED APPLICATION

This application is a nonprovisional of, and claims the benefit of, provisional application 61/364,672, filed Jul. 15, 2010, entitled "Toxic Substance Encapsulation Product/Method", by applicant Scot LaVelle, which is hereby incorporated by reference herein in its entirety.

BACKGROUND

The present invention relates to encapsulation systems and methods for toxic substances.

There are three major toxic substances addressed in the EPA's Toxic Substance Control Act (TSCA): molds, lead and asbestos. Other toxic substances worth noting include biohazard and chemical toxins such as blood-borne pathogens and chemical residues at crime scenes. Toxic substances are typically introduced into the body through inhalation, ingestion or absorption.

While TSCA bans the manufacture, processing, use and distribution of certain toxins, the fact remains that many older structures were constructed using materials manufactured with toxins. Other toxins may also be present due to naturally occurring phenomenon or due to human activities. When present, each toxic substance presents the occupants of the structure with the challenge of mitigating potential health effects.

Current methodologies for management, cleanup and disposal of environmental toxic substances fall under the guidance of the EPA, OSHA and state agencies. Two generally utilized strategies for mitigation are removal or encapsulation. Either strategy depends on development of containment areas that isolate toxic substances from adjacent settings to minimize the areas of contamination.

To be effective, containment requires sealing off the affected area using plastic or polyethylene sheeting. The sheeting is stapled, taped or otherwise secured to the walls, ceilings and flooring to create an isolated environment in which to begin remediation. Generally, the workers are clothed in protective suits and use respiration equipment that filters airflow, preventing toxins from being inhaled.

In the containment chamber, a number of activities might take place. Where moisture is present, one or more dehumidifiers are put to work. One or more air scrubbers might be used to draw air through a series of filters designed to extract toxic particles from the air. Many times, the official recommendation is to apply a mist of water to the environment in hopes of weighting down small particles rather than having them airborne. The heavier particles are then removed using standard cleaning techniques.

In every instance the purpose of containment, removal and remediation is to prevent the toxic substances from contact with humans through inhalation, ingestion or absorption. Generally, toxic substances are most likely to be inhaled. The greater the concentration of airborne toxins, the longer the exposure to the airborne toxins, the greater there will be a likelihood of toxicity in humans and other animals.

Molds and other fungi grow where there is moisture and a food source. Moisture may be introduced by naturally occurring environmental conditions such as high humidity, normal precipitation, flooding, or ground water issues. Mechanical failures such as leaking pipes, water heater failures or damp basements may also be a source of moisture. The food source can be something as simple as sheetrock or wood. Mold spores may enter the structure through normal airflow and lie dormant for extended periods until moisture is introduced. Then, molds propagate quickly creating a potential for human interaction. Because mold spores range from 3-100 microns in size (some as small as 1 micron), they easily become airborne with the normal airflows created by the typical air conditioner or heater. Once airborne, these tiny particles can infiltrate furnishings, clothing, food and equipment, such as air conditioners that can spread them throughout the building. Most importantly, these tiny mold spores can be inhaled, potentially with toxic effect.

While not all people are equally sensitive to the effects of all types of mold, some are more adversely affected than others. Those more likely to be affected include infants, children, elderly people, pregnant women and individuals with weakened immune systems, allergies, and asthma. Studies have shown causal relationships between these fungi and respiratory disease, toxic dust syndrome, hypersensitivity pneumonitis, allergic lung disease, infant idiopathic pulmonary hemorrhage, Stachybotrys-induced lung injury, neurotoxicity, carcinogenicity, acute liver injury, endocrine toxicity, renal and urological toxicities and complications of pregnancy.

Mold is often found growing under the structure on floor joists. It is also found in bath and shower areas, laundry rooms, under cabinets and on walls. Many times, it is found inside walls and under flooring.

Once mold is revealed, the likelihood of spores becoming airborne increases greatly. Based on the intensity of the mold and the sensitivity of the occupants, a decision has to be made whether to stay and endure or evacuate the premises until the remediation process has been completed. Waiting for the containment, drying, removal, repair and cleanup can be frustrating, costly and time consuming. The remediation process may include sanding the mold off fixed surfaces like floor joists, then painting the sanded surfaces with an antifungal paint.

What is needed in the art is something that quickly and effectively prevents mold spores from becoming airborne.

Lead contamination is equally toxic. According to the EPA, the most common way to get lead in the body is from dust. Lead dust from decaying lead-based paints, used in older structures, can be found on surfaces like air conditioners and flooring. Dust may accumulate to unsafe levels. Then, normal hand-to-mouth activities, like playing and eating (especially in young children), move that dust from surfaces like floors and windowsills into the body. The health effects include damage to the central nervous system, circulatory and blood-forming systems, reproduction system, kidneys and gastrointestinal tract. Especially sensitive people include children six years and younger, as well as, prenatal children.

The EPA; OSHA; HUD and state regulatory authorities recommend encapsulation when possible and removal where absolutely necessary. As with remediation of mold, keeping particulate from becoming airborne is key to minimizing the damaging health effects. This may mean removing occupants from the structure during restoration or removal. It includes containment and wetting the area. Special hazardous material disposal methods are mandated. Expect this process to be equally time consuming, more cumbersome, and even more costly than mold remediation.

Lead may also be introduced into the environment through lead pipes and lead solders. Here, lead contaminates may be introduced through ingestion or absorption from drinking, bath and laundry waters. If used as a source for watering gardens, absorption may be through ingestion of produce.

Replacement is the preferred solution for this contaminant, however, encapsulating the pipe and using an alternate piping source would be possible.

What is needed in the art is something that quickly and effectively prevents lead dust from becoming airborne.

Asbestos is a mineral fiber that has been used commonly in a variety of building construction materials for insulation and as a fire retardant. The term "asbestos" generally refers to six fibrous minerals: tremolite asbestos, actinolite asbestos, anthophyllite asbestos, chrysotile asbestos, amosite asbestos, and crocidolite asbestos. When asbestos-containing materials are damaged or disturbed by repair, remodeling or demolition activities, microscopic fibers become airborne and can be inhaled into the lungs where they can cause significant health problems including asbestosis, lung cancer and mesothelioma.

This high profile toxin is prevalent in structures built prior to 1978. Beginning in 1979, federal regulations prohibited manufacturers from using asbestos in building materials. While removal was once considered the preferred method of addressing asbestos, current guidelines recommend the asbestos be left undisturbed and encapsulated.

Specifically, NESHAP regulations address both friable asbestos and non-friable asbestos that have become friable. Friable asbestos is defined as easy to break or crumble by hand. It has a high probability of releasing asbestos fibers into the air. Normally, these substances have become friable due to weathering, normal deterioration over time, excessive use or exposure to chemicals or high heat. Examples include: acoustical plaster, spray-applied insulation, duct connectors, insulation and pipe coverings. Non-Friable asbestos is defined as difficult to break by hand and has a low probability of releasing fibers into the air. However, Category I Non-Friable materials, which are unlikely to be made friable, are recommended for removal only if they are in very poor condition. Otherwise, they should be encapsulated. This category includes vinyl floor coverings and vinyl asbestos tile. Category II Non-Friable materials include all not Category I, materials more likely to be made friable, as they are not resistant to weathering or crushing forces and may be subjected to extreme conditions or excessive use.

Common asbestos products may be found in basements, roofs, outdoor siding, ceilings (especially acoustic ceilings or "popcorn" ceilings), flooring, attics and plumbing. It was often used in insulation, patching compound, joint compound, cement sheets, millboard, paper insulation, heating insulation, and fireproofing. Materials applied to walls and flooring that may contain asbestos include soundproofing material, decorative or textured paints, vinyl floor tiles, asphalt tiles, rubber tiles, insulation board on walls, acoustical plasters or paints, spackle, ceiling tiles, caulking or putty, adhesives and cement pipes. Asbestos may be present in basements, the exterior of homes and household appliances such as: roofing shingles, exterior siding, steam pipes, boilers, furnace ducts, and gaskets, wood or coal stoves.

Asbestos in a home or building can be dealt with in four main ways: enclosure, encapsulation, repair or removal. Complete removal of asbestos-containing materials is known as asbestos abatement, the most dangerous option, as there is a high risk for airborne asbestos particles during removal of ACMs. Removal of asbestos must be done in compliance with NESHAP asbestos regulations and disposed of in a specially designated hazardous waste facility.

As with other toxic substance remediation, asbestos removal requires significant resources. These include creating a sealed containment area, using plastic sheeting and duct tape; ventilation to the outside; and protective clothing. Creating a wet room to minimize airborne particulate is highly recommended. Because of the high standards necessary to safely remove asbestos, other factors will influence the decision. These are the size of the job (square foot area); type of material or surface; the type of asbestos fibers present; condition of the asbestos (painted over, water-damaged, flaking, etc); accessibility of the material; ability of the work area to be sealed off and made air-tight; and airflow through the work area.

What is needed in the art is something that quickly and effectively prevents asbestos fibers from becoming airborne.

Bio-hazardous and chemical contaminants can pose serious health risks. Blood-borne pathogenic substances resulting from accident, trauma, crime or death; crime scene residues such as tear gas or pepper spray; and toxic chemical residues such as those left in the wake of a methamphetamine lab fire are toxic substances that can pose serious health consequences for occupants of affected buildings, law enforcement professionals, and cleanup personnel.

Blood can contain such toxins as HIV; Hepatitis B; and Hepatitis C. Professional cleanup organizations follow blood-borne pathogen universal precautions by sterilizing broken glass, removing furniture, mattresses and other transportable items that have been contaminated, and removing visible bio-hazardous materials in properly labeled waste containers. This step is followed by assessing the extent of damage underneath carpeting, in flooring or on walls. Wooden flooring, linoleum and drywall may require removing to prevent continued odors and prevent attracting bugs and animals (from odors than might emanate).

Tear gas and pepper spray residues at crime scene can prove equally toxic to personnel examining the scene. Deployed tear gas penetrates windows and walls leaving pockets of heat and moisture activated carcinogen. Unmitigated residues expose occupants to skin, eye and lung irritation.

Toxic chemical residues, such as those found in methamphetamine lab crime sites, pose serious risk to inhabitants, personnel on the scene and cleanup crews. The volatility of the residues requires special HAZMAT teams to effectively remove all toxins. While requirements for cleaning do vary from state to state, ventilation along with protective clothing is always required.

What is needed in the art is something that quickly and effectively prevents pathogens and toxic residues from becoming airborne.

Many toxic substances, found in structures such as homes and businesses, consist of small particulate.

Should these inert toxic particulate be subjected to even the slightest of forces; such as caused by heating and air conditioning systems; airflow from open doors or windows; changes in barometric pressure; or physical disturbance, they are lifted off their resting places and float upon whatever air currents that are present.

Because humans and other living creatures may be present in an environment where air currents are supporting toxic particulate, the floating toxic substances are likely to be affected by secondary airflows; such as those created by the process of inhalation. Therefore, during the process of inhalation, airborne toxic substances are inhaled into the bodies of humans and other living creatures.

Once inside a body, toxic substances are deposited on various organ linings, such as lung tissues, and subsequently processed through various organs. As toxic substances are generally incompatible with normal bodily functions, it is likely that various adverse health effects are created. Examples of such are bronchial distress, lead poisoning, or lung cancer.

In that introduction of toxic substances into a body is generally considered undesirable and that toxin-free air is the safest way to avoid these health hazards, it is desirable that a potentially toxic environment be remediated of toxins as quickly and thoroughly as possible. Currently, there are several variations of toxic substance remediation and abatement methods utilized by remediation specialists; recommended by governmental health organizations such as the EPA; OSHA and state entities; and individuals. Each method begins with containment and is followed by either encapsulation or abatement.

Under current methodology, once the site is deemed to need containment, the remediator, clothed in safety apparel and possibly with air being filtered by use of a respirator, will seal off the affected area by creating walls of plastic sheeting attached securely with staples, tape or other means so that the only means of airflow is through windows, doors or other ports to the exterior of the building. Once containment is effected, if abatement follows, current methodology would dictate materials being removed be secured through cleaning, encapsulation or a combination of both.

Cleaning methods differ from one toxic substance to another; however, the most prevalent methods require a wetting process whereby the areas, affected by toxic substances, are saturated with moisture. The desired intent is to have the moisture fall upon the toxic substance particulate, thereby rendering it too heavy to be supported by air currents and be subjected to inhalation by humans and other animals.

Because wetting the containment area during the cleaning process introduces moisture, a subsequent drying process must be employed. The subsequent drying process typically takes place in the containment area using a combination of both air dryers to draw moisture from floors, walls and cabinets along with air scrubbers to filter and remove whatever disturbed airborne particulate was not removed during the cleaning process.

Cleaning methods using containment areas, wetting processes, drying efforts and air scrubbing require many hours of skilled labor, many raw materials and may take days to complete. Some toxic substances like mold are regenerative and when left unattended for as little as 48 hours can grow. Since some jobs take days or weeks to complete, the likelihood of accelerated airborne toxins increases.

While the containment method that uses wetting, cleaning, drying, air scrubbing and safe disposal may be used for some sites where the toxic substances are abated or removed, for other sites encapsulation is the preferred method. This widely used remediation method, encapsulation, similarly uses steps of containment, wetting, cleaning by scraping or sanding surfaces, drying, air scrubbing and safe disposal of toxic substances. Examples of remediation by encapsulation include are mold, lead and asbestos, to name a few.

After the affected areas are rid of the toxic substances, the remediator proceeds to apply by brushing, rolling or spraying "liquid paints" such as chemical biocides for molds or others that might be suitable for lead or asbestos. For some toxic substances, removal or cleaning is adequate; nonetheless, there are recommendations from the EPA, OSHA and state agencies that call for not disturbing the area except to fully encapsulate. One such example is asbestos because in its inert unchanged state, fewer carcinogenic fibers will be released into the air. For brittle or friable toxic substances, such as lead paint or asbestos, the common method of encapsulation is to apply, by brushing, rolling or spraying, one or more layers of selected liquid coats that are similar to paint in consistency. For multiple coats, the curing times may take as long as two weeks.

For some toxic substances that need to be remediated, another method is to encapsulate or encase the affected areas using common building materials such as gypsum wallboard. With this method of encapsulation or encasement the materials laminated to the affected surfaces are sealed with liquid bonding adhesives. This method is costly in labor, raw materials, as well as, installation time.

SUMMARY

The present invention may provide a product/method to quickly and effectively prevent molds, lead, asbestos and other toxic substances from becoming airborne.

Inhalation may be defined herein as the process whereby living creatures exchange gases from within their bodies with gases that are present outside their bodies.

The method and apparatus of the invention is responsive to the fact that airborne toxic substances present a clear and present danger to occupants of affected buildings, and no current remediation method or product addresses the need to quickly and effectively prevent toxic substances from becoming airborne.

In one embodiment, the present invention may include an adhesive-backed substrate made from common materials. The adhesive-backed substrate may be used to cover and smother potentially airborne toxic substances to its host surface, such as walls, floors, furniture or cabinets, for example. The substrate may be formed of air-tight plastic, such as polyester or polypropylene, for example.

The adhesive-backed substrate of the invention may be disposable.

Environments that foster mold growth must have moisture present and surfaces that serve as a food source. However, it is difficult to adhere a substrate to a surface in such a moist environment. The bandage of the invention has characteristics that enable it to encapsulate toxins in such a moist environment.

Mold has four basic requirements to grow: the presence of mold spores, an adequate food source, appropriate temperatures, and considerable moisture. In order to encapsulate mold, the inventive bandage may be able to function effectively and fully in these conditions. The inventive bandage may adhere to a contaminated surface in these conditions, and may limit the ability of the contaminated surface to support the further spread of mold.

The inventive bandage may have three novel characteristics that enable it to encapsulate mold in the above-described conditions: the type of adhesive employed, the amount of adhesive employed, and the type of carrier (i.e., substrate) employed.

In one embodiment, the invention comprises a method of encapsulating a toxin on a contaminated surface. A plastic air-tight substrate having first and second opposing surfaces is provided. An adhesive substance is disposed on the first surface. The first surface of the plastic substrate is applied to the contaminated surface such that the plastic substrate is adhered to the contaminated surface, and such that the toxin is completely covered by the plastic substrate.

In another embodiment, the invention comprises a bandage apparatus for encapsulating a toxin on a contaminated surface. The bandage apparatus includes a plastic air-tight substrate having first and second opposing surfaces. An adhesive substance is disposed on the first surface of the substrate. The adhesive substance is applied to the contaminated surface to thereby adhere the bandage apparatus to the contaminated surface. An exterior layer is oriented substantially parallel to the substrate. The substrate is disposed between the adhesive substance and the exterior layer. Adhering means adheres the exterior layer to the substrate.

In yet another embodiment, the invention comprises a method of encapsulating a toxin on a contaminated planar surface, including attaching a frame to the planar surface such that the frame substantially surrounds the toxin. A plastic air-tight substrate having first and second opposing surfaces is provided. An adhesive substance is disposed on the first surface. Opposite ends of the first surface of the plastic substrate are applied to respective opposing portions of the frame such that the toxin is encapsulated between the planar surface, the frame, and the plastic substrate.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2a is a side view of a plurality of bandages connected together in a roll carried by a roller;

FIG. 2b is a top view along line 2b-2b in FIG. 2a;

FIG. 5c is a plan view of a third step of a method of the invention for installing a bandage apparatus;

FIG. 12 is a side sectional view of yet another embodiment of a bandage apparatus of the present invention.

Figure 1:
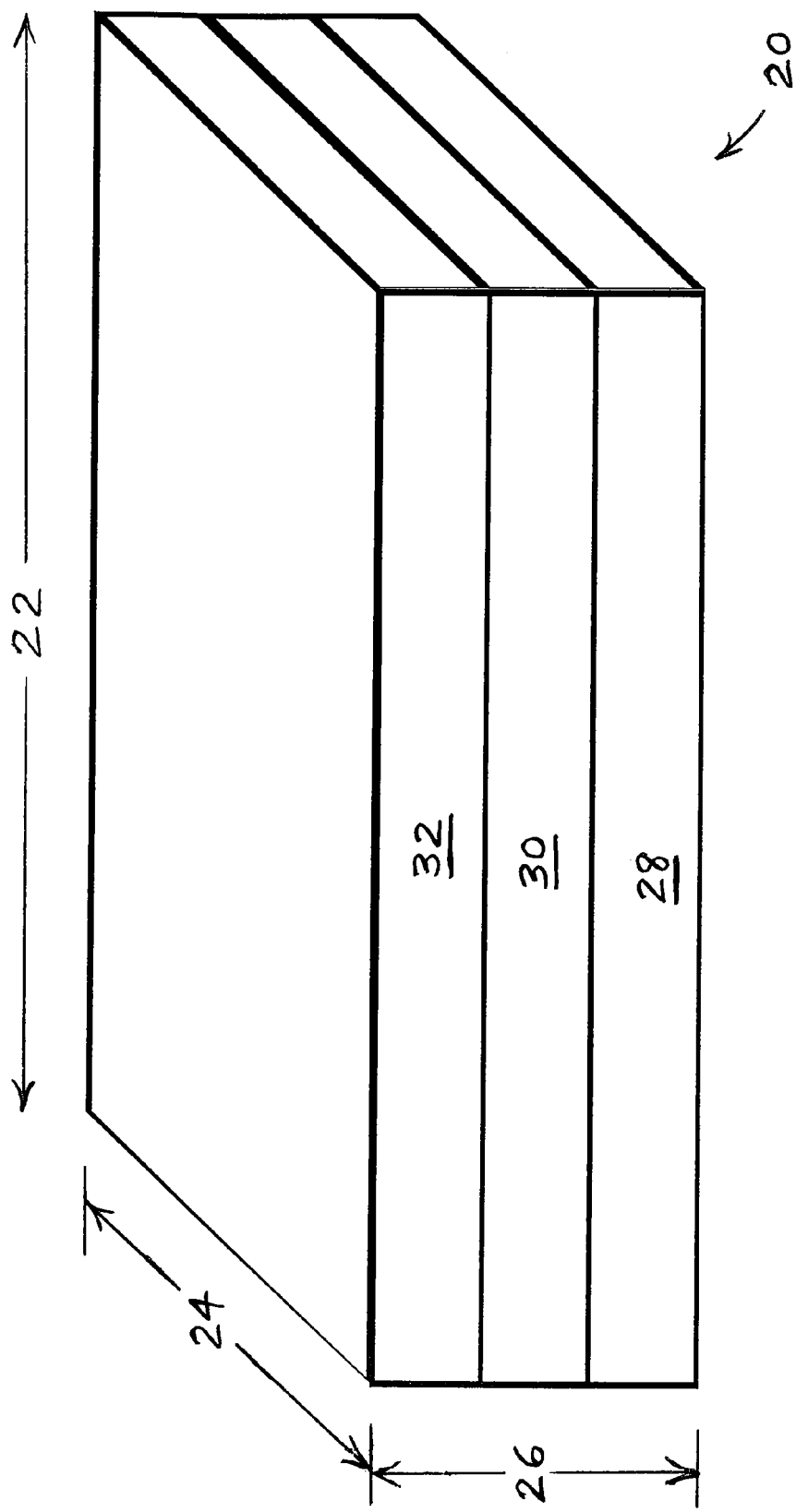
FIG. 1 is a perspective view of one embodiment of a bandage apparatus of the present invention.
Figure 3:
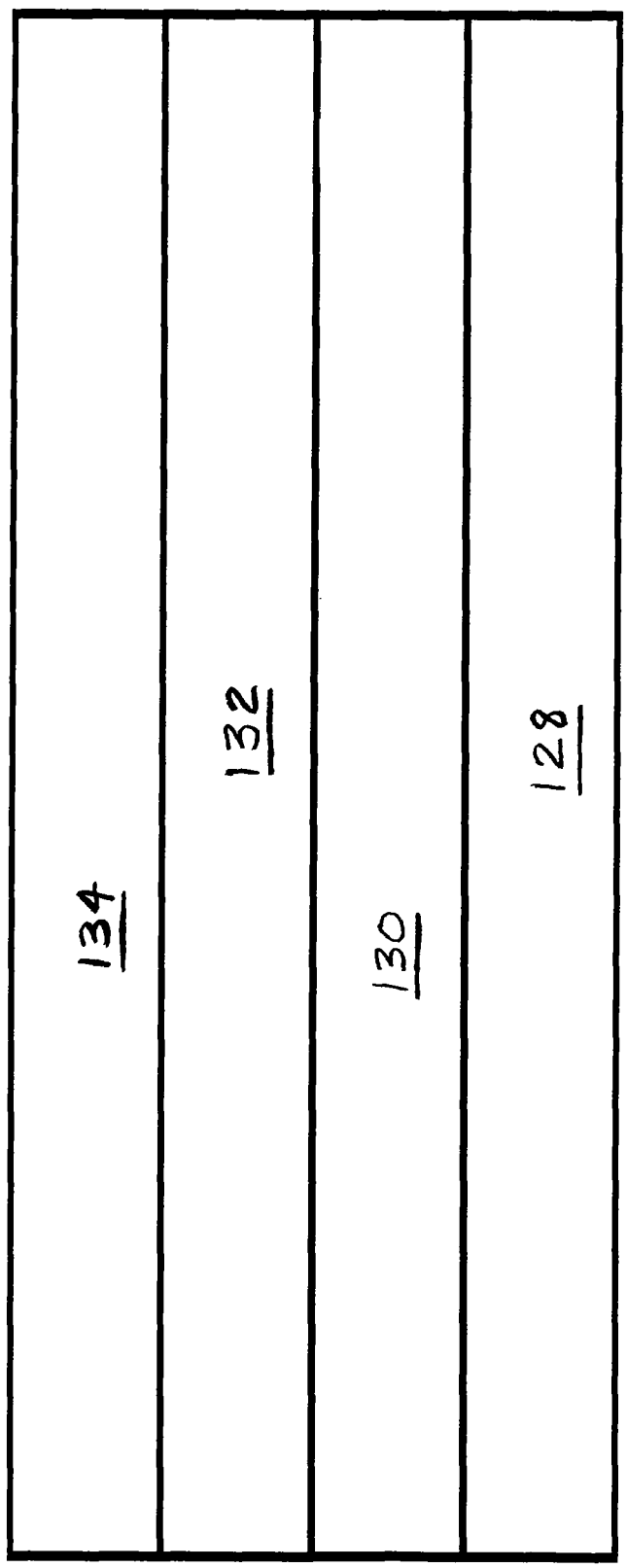
FIG. 3 is a side sectional view of another embodiment of a bandage apparatus of the present invention.
Figure 4:
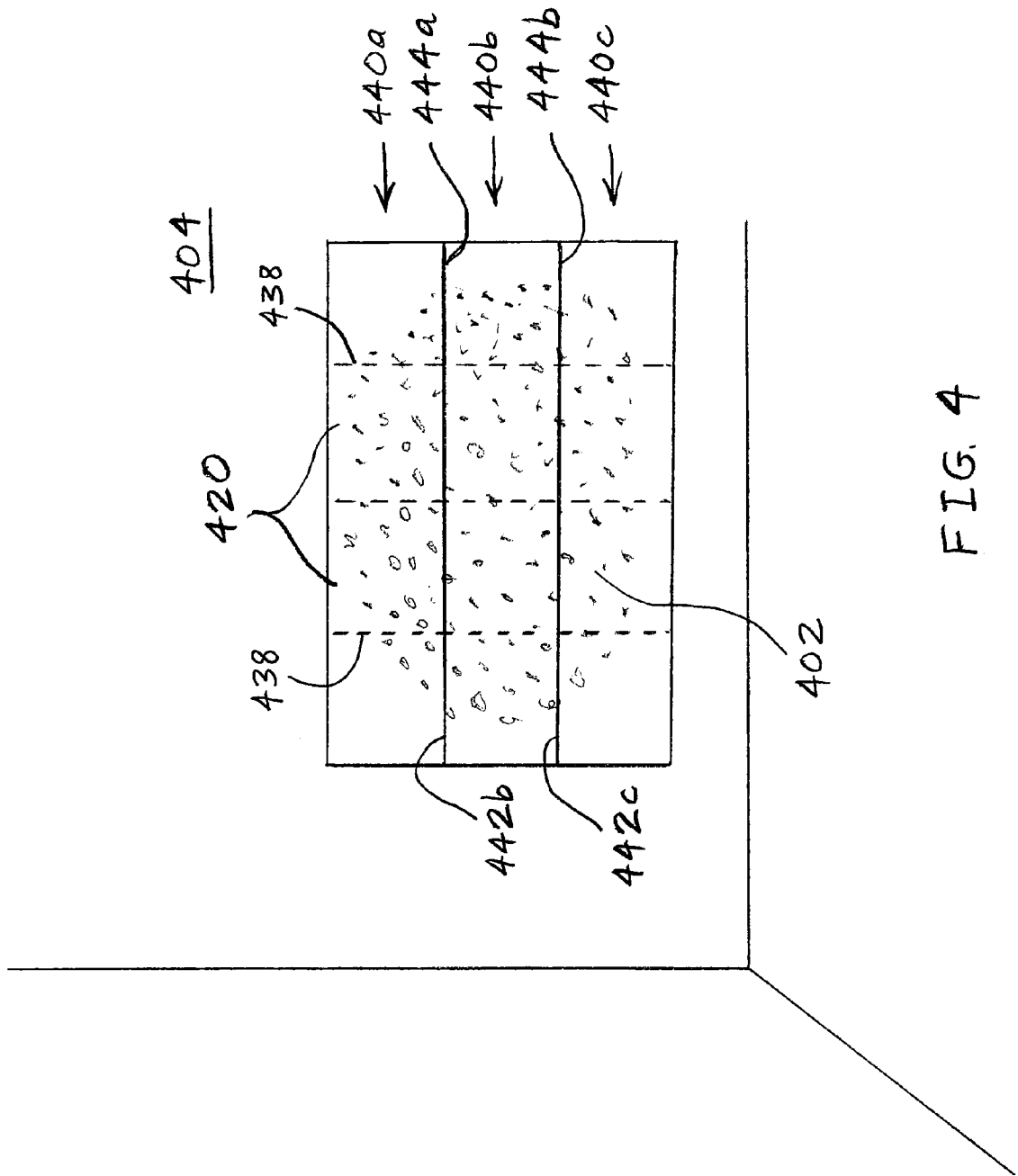
FIG. 4 is a plan view of three strips of inventive bandages applied to an area of toxins on a wall.
Figure 5A:
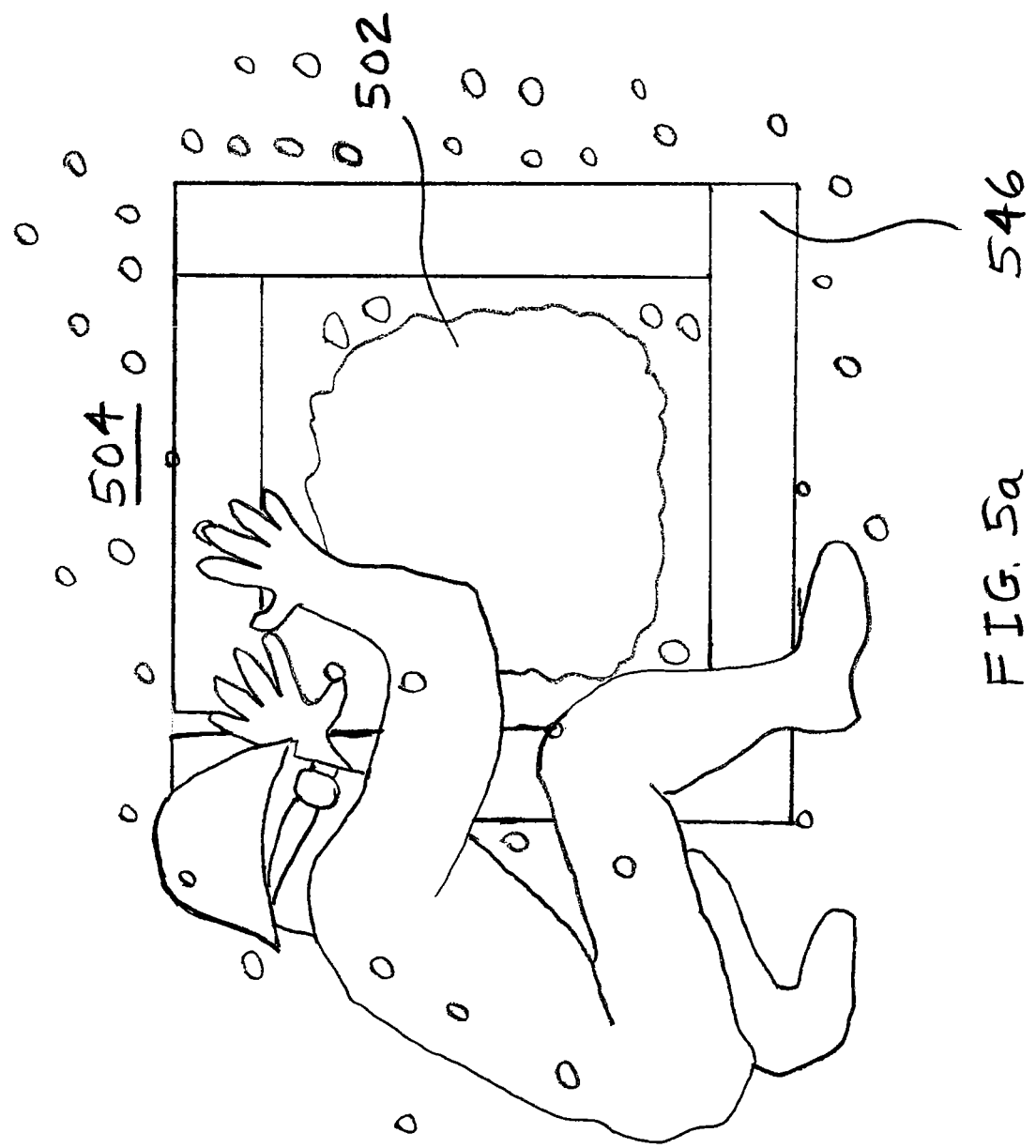
FIG. 5a is a plan view of a first step of a method of the invention for installing a bandage apparatus.
Figure 5B:
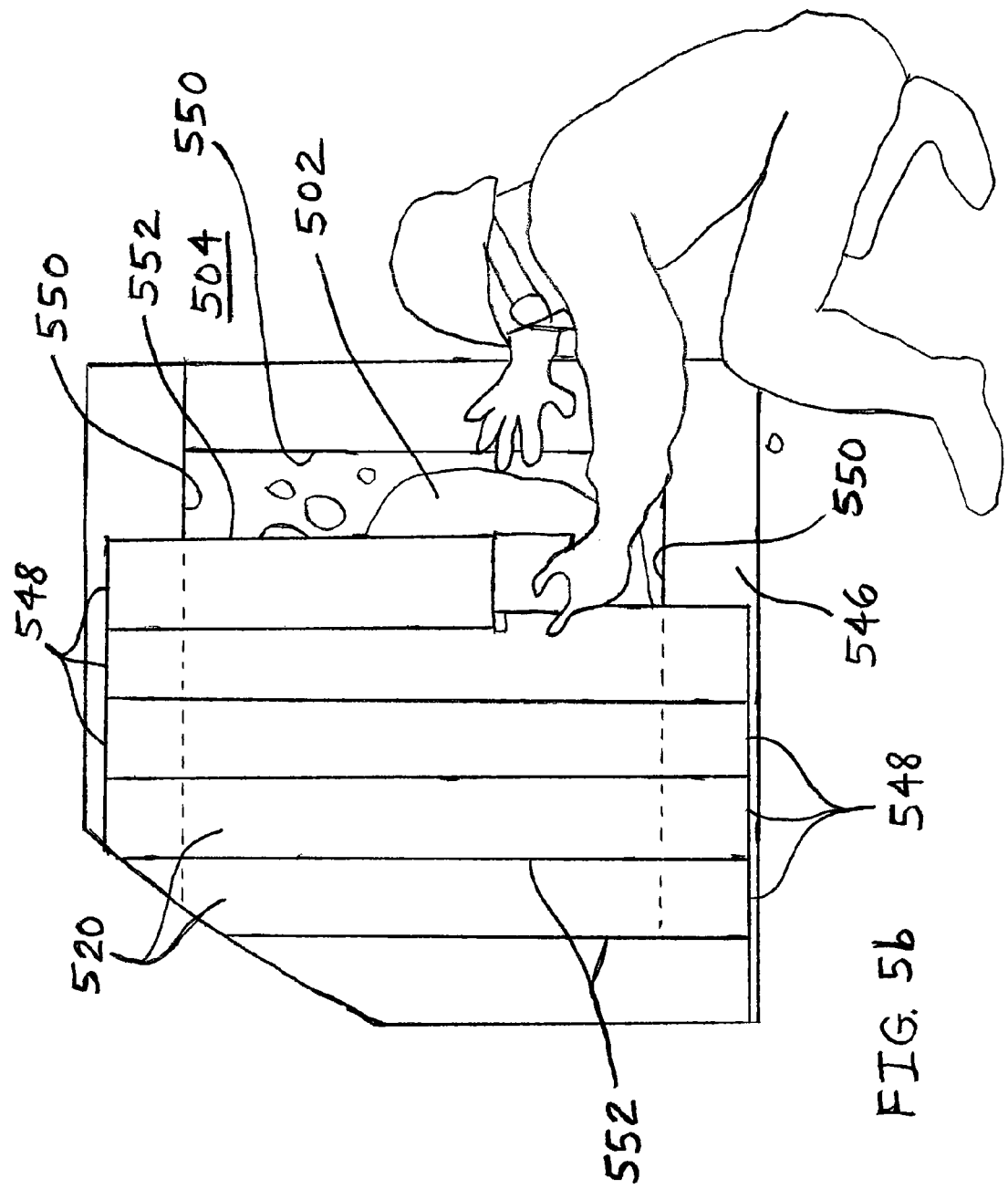
FIG. 5b is a plan view of a second step of a method of the invention for installing a bandage apparatus.
Figure 6:
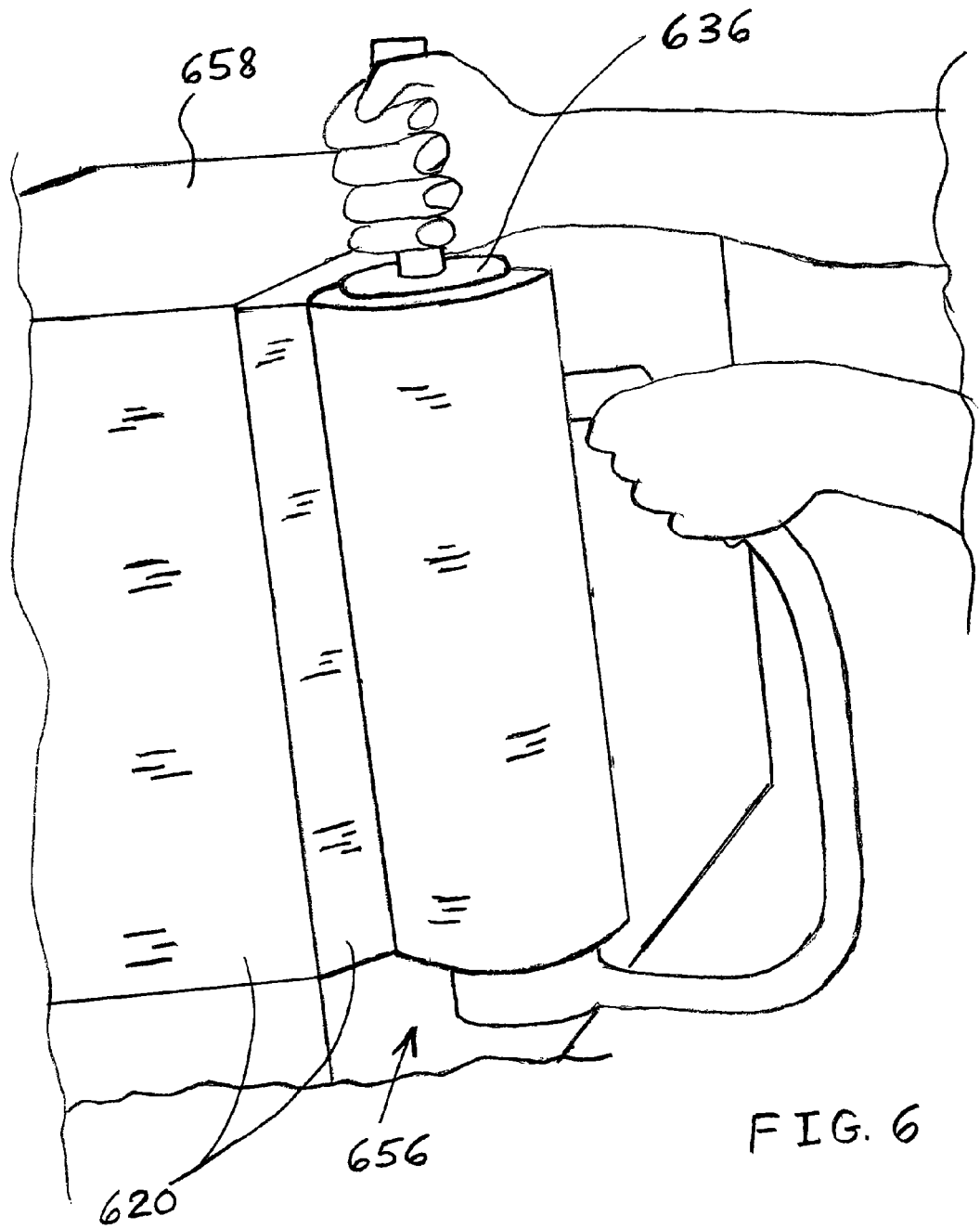
FIG. 6 is a perspective view of an inventive bandage in the form of a continuous roll being applied and carried by a shrink-wrap dispenser.
Figure 7:
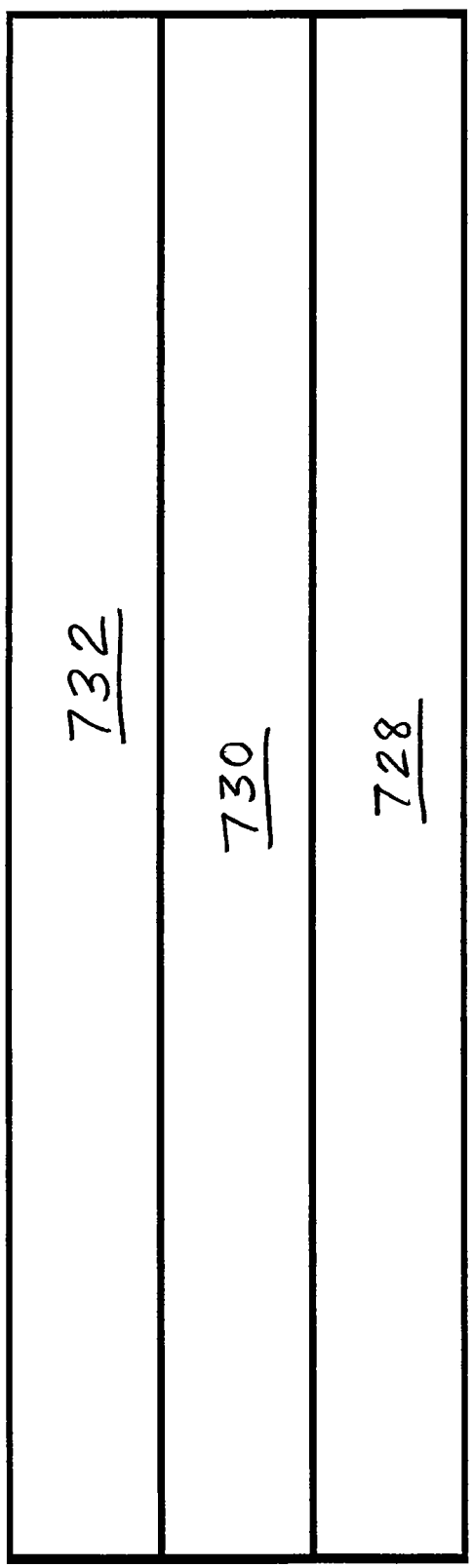
FIG. 7 is a side sectional view of yet another embodiment of a bandage apparatus of the present invention.
Figure 8:
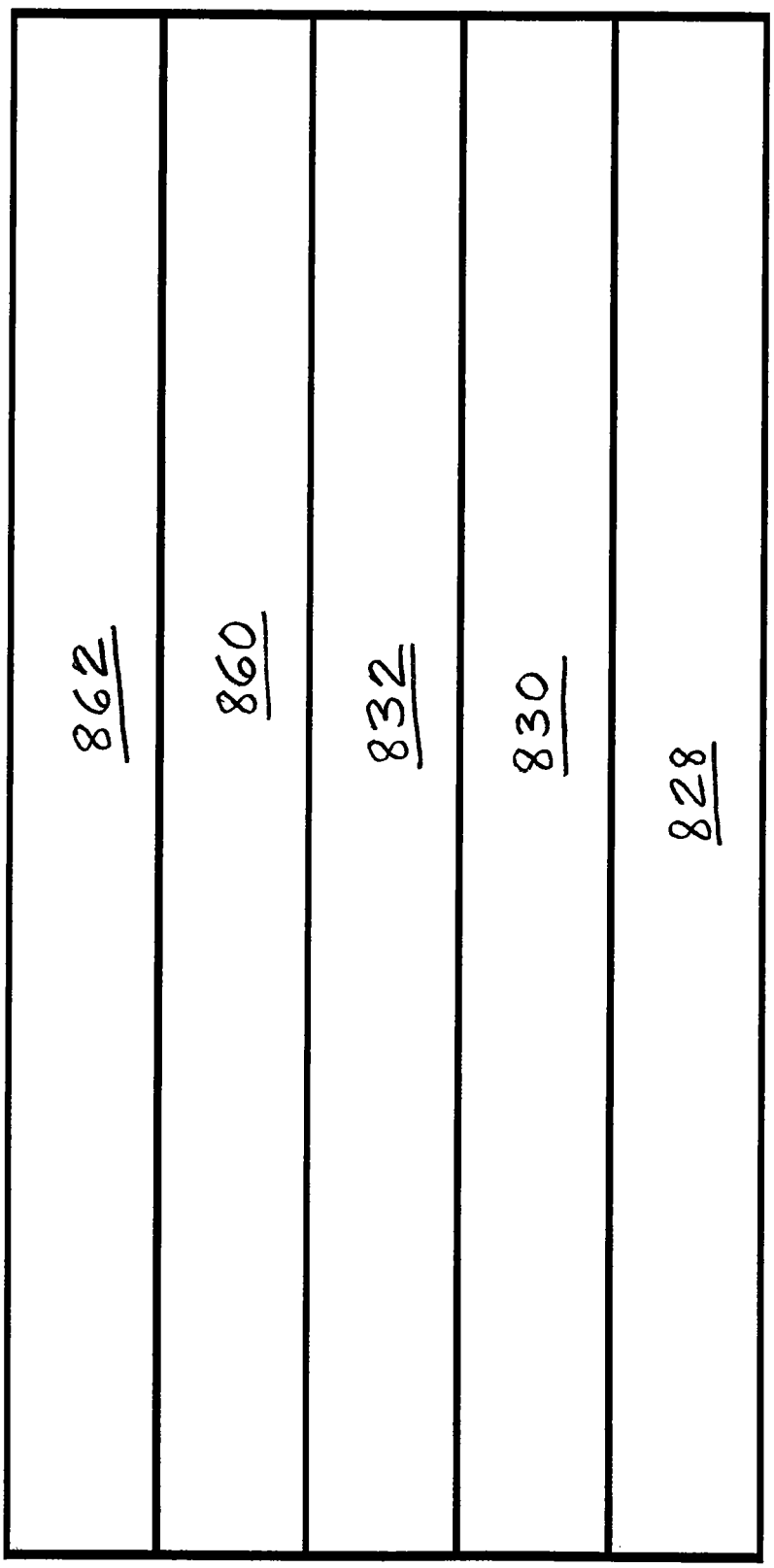
FIG. 8 is a side sectional view of still another embodiment of a bandage apparatus of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

One embodiment of an apparatus of the present invention in the form of a multilayered "bandage" 20 is shown in FIG. 1. Bandage 20 may be sized to be easily handled by a human installer and to cover at least portions of walls, ceilings, floors, etc. having toxins thereon. More particularly, bandage 20 has a width 22 and a depth 24, each of which may range between about two inches and forty-eight inches. Although other embodiments illustrated herein are shown in cross section, which does not show width and depth, it is to be understood that any and all of the other embodiments may have the same width and depth ranges as bandage 20. A height 26 of bandage 20 may be approximately between 0 and one-half inch. Thus, height 26 is shown larger than to scale in FIG. 1 for clarity of illustration.

Bandage 20 may be a carrier/barrier with pressure-sensitive adhesive. In the specific embodiment of FIG. 1, bandage 20 includes a substrate layer 28 which may be extruded polyester. A middle layer 30 may be in the form of surface texturing on layer 28 and/or a discrete layer of coating. In either form, layer 30 may provide layer 28 with a higher surface energy for adhering to layer 32, which may be a rubber-based pressure-sensitive adhesive, for example. Layer 32 may include a fungicide, which may kill mold.

During use, a human installer may place bandage 20 over a structural surface having a toxin thereon such that adhesive layer 32 engages or contacts the structural surface. Thus, bandage 20 is adhered to the structural surface, thereby suffocating (e.g., sealing in an air-tight manner) a living toxin such as mold, or capturing and/or encapsulating a non-living toxin such as asbestos.

As shown in FIG. 2*a*, bandage 20 may be provided in a roll 34, with the adhesive side facing radially inwardly, and may be fed from a roller 36. As shown in FIG. 2*b*, individual bandages 20 may be connected to one another in roll 34, in a side-by-side arrangement, and may be separated from each other by perforations 38. Thus, the installer may unroll one or more bandages 20 from roll 34, and may break the connection at the perforations 38*a* that separate the one or more bandages 20 (e.g., three bandages 20) from the remainder of roll 34. That is, the installer may separate bandages 20 from each other at perforations 38 without the use of a mechanical cutting device. Instead of perforations, rollers 36 may include a cutting blade (not shown) that enable the installer to cut of the desired length of bandage 20 from the roll.

Substrate 28 may have a structural integrity or level of rigidity that prevents it from collapsing, buckling, or doubling over while handling. Substrate 28 may be formed of clear, colored or printed, extruded synthetic polyester. As mentioned briefly above, substrate 28 may be formed of polyester and may be coated or textured on one side in order to increase the surface energy necessary to bond to pressure sensitive adhesive 32. Adhesive 32 may be in the form of a rubber-based or acrylic-based hot melt. However, in one embodiment, substrate 28 is in the form of a tinted, printed, extruded, five mil thick (i.e., 0.005 inch thick), synthetic polyester substrate which may be precisely coated, using a precision commercial coater. In this embodiment, the adhesive may be in the form of a seven mil thick rubber-based, pressure sensitive adhesive characterized by a high viscosity curve, a high melting point, and a high initial bonding-strength.

Another embodiment of a bandage 120 of the present invention is shown in FIG. 3 in the form of a carrier/barrier with pressure-sensitive adhesive and a silicone covering. With the coating or texturing 130 of the polyester substrate 128 facing the adhesive applicator (not shown) on the precision commercial coater (not shown), an extremely generous coating of pressure sensitive hot melt 132 may be applied. With the specified amount of pressure sensitive hot melt 132 applied to the polyester substrate 128, the "fly-paper-sticky" adhesive 132 is ready to cool down and be rolled or to have a silicone "crack-and-peel" sheeting 134 applied to the gluey side creating a "bandage" to snare toxic substances. When the installer is ready to install bandage 120, he peels off sheeting 134 to expose the sticky adhesive 132 and presses bandage 120 against the toxin-bearing surface, sticky side down, thereby encapsulating the toxin.

In one embodiment, these bandages 120 are provided in rolls having widths between two inches and forty-eight inches. In another embodiment, the bandages 120 are provided as individual or discrete bandages, or are provided in a package of stacked bandages 120 each ranging in size between four inches by four inches and twenty-four inches by forty-eight inches.

By applying bandages 20 and/or bandages 120, the toxic substances may be smothered to walls, floors and fixtures quickly and effectively. The installer may visually discern a boundary of the area bearing toxic substances on the surface and may apply the bandage such that an edge of the bandage extends just beyond the boundary. The installer may then press the edge of the bandage to the surface so that both the affected area and some unaffected area are covered by the width of the roll. FIG. 4 illustrates the inventive bandages 420 being used to cover an area of toxins 402 on a wall 404. The installer may proceed to unroll, pressing firmly, the glue-laden side of the bandage onto the surface of wall 404, across the surface, and just beyond the end of the toxic substance 402. For example, the installer may unroll four bandages 420 off of a roll (not shown), and may break the fourth line of perforations to thereby yield a first strip 440*a* of four side-by-side bandages 420 separated by three lines of perforations 438. Each subsequent pass over the adjacent toxic substance covered area may be applied the same way, slightly overlapping the previous bandage strip 440 until all the toxic substances are encapsulated beneath bandages 420. That is, a second strip 440*b* may be applied such that an upper edge 442*b* of strip 440*b* slightly overlaps a lower edge 444*a* of strip 440*a*. Subsequently, a third strip 440*c* may be applied such that an upper edge 442*c* of strip 440*c* slightly overlaps a lower edge 444*b* of strip 440*b*.

Bandages 420 may have a tinted polyester substrate such that toxins 402 are visible through bandages 420, but the tinting provides bandages 420 with ample visibility against the surface of wall 404. Thus, the boundaries of bandages 420 on wall 404 may be easily seen. Bandages 420 may be produced in different colors of tinting so that bandages may be selected of a particular a tinting color that is most visible against the particular color of wall 404. For example, bandages 420 of a tinting color that does not match the color of wall 404 may be selected. In another embodiment, bandages are decorated in opaque designs, similar to wallpaper, so that the covered toxins are no longer visible.

One embodiment of a method of applying/installing the inventive bandages and possibly removing the toxin-covered surface is described below with reference to FIGS. 5*a-c*. In a first step shown in FIG. 5*a*, a wood frame 546 is applied to wall 504 around the area bearing toxins 502. Frame 546 may be installed beyond the edge or boundary of the contamination. Frame 546 may be adhered or screwed to wall 504, for example. Frame 546 may be constructed of 1×4 lumber, for example. A gel or adhesive may be generously applied to the surface of frame 546 that faces wall 504 such that toxins 502 cannot pass between wall 504 and frame 546. Thus, after bandages are applied, toxins 502 may be sealed between wall 504, frame 546 and the bandages in an air-tight manner.

In a next step, shown in FIG. 5*b*, frame 546 is used as a dry contact point to which ends 548 of bandage strips 520 may be applied to fill in the framed area. The adhesive surface of bandage strips 520 are pressed against toxins 502 within frame 546. Thus, bandage strips 520 may be adhered in a horizontal orientation to the inner edges 550 of frame 546 until bandage strips 520 engage wall 504. An edge 552 of each newly applied bandage strip 520 is overlapped over an edge 552 of an adjacent bandage strip 520. Thus, each newly applied bandage strip 520 is overlapped with frame 546 and one or two adjacent strips 520 until toxins 502 are sealed or encapsulated between wall 504, frame 546 and strips 520.

In a next step, shown in FIG. 5*c*, the installer may visually inspect the covered area for any gaps between bandage strips 520, and between frame 546 and strips 520. Any such gaps may be covered with one or more additional bandage strips 520. Finally, in the case of wall 504 being formed of drywall, the drywall may be cut along outer edges 554 of frame 546, and the encapsulated section of cut drywall may be removed and disposed of.

This manual unrolling and pressing of the bandages onto the toxic substance-covered surfaces is one embodiment of an application method of the invention. However, other techniques and tools for assisting in the application may be used. For example, as shown in FIG. 6, a dispenser 656 that is commonly used for applying stretch wrapping may be used to apply a continuous bandage strip 620 that is carried on a roller 636. As shown, the roll of bandage strip 620 is seated upon roller 636 of dispenser 656. With two hands of the installer guiding dispenser 656, bandage strip 620 is unrolled and pressed into the toxic substance laden surface, which in the illustrated example, is the surface of a box 658. Similar, techniques and tools may allow for the removal of a crack and peel label-like covering over the adhesive. The crack and peel label-like covering may be formed of silicone paper, which may be coated and/or impregnated.

In one embodiment, the polyester substrate may be manufactured with, or impregnated with, a non-soluble chemical to improve fire resistance. However, using other substrate materials with similar characteristics or adding topical chemical treatments to substrates, coatings and/or adhesives after their manufacture, and during the coating process, may be desirable for improving flame retardant qualities. In the specific example embodiment of FIG. 7, a bandage 720 of the present invention in the form of a fire retardant carrier/barrier with pressure-sensitive adhesive is shown. Bandage 720 includes a five mil thick, single layer polyester substrate 728 having an optional layer 730 of coating or texturing. Substrate 728 may be formed of non-soluble, fire resistant extruded polyester. Layers 728, 730 may be covered with a seven mil thick layer 732 of pressure sensitive rubber based adhesive.

In another embodiment, shown in FIG. 8, bandage 820 is in the form of a multi-layered carrier/barrier with pressure sensitive adhesive. Bandage 820 includes a substrate 828 which may be extruded polyester. Substrate 828 may include a layer 830 of coating or surface texturing to create a higher surface energy. Applied to layers 828, 830 may be a layer 832 of rubber-based pressure sensitive adhesive. In addition to these three layers which are also included in other embodiments described above, bandage 820 may include additional layers of substrate and adhesives such that the impenetrability of bandage 820 is greater. In the specific example embodiment of FIG. 8, bandage 820 includes a five mil thick, single layer, extruded polyester substrate 860. Layer 860 is possibly coated or textured on one side that is subsequently covered with a seven mil thick coating 862 of pressure sensitive rubber-based adhesive. In similar embodiments, the bandage may be constructed with different substrates that provide non-skid, noise dampening and cushioning properties.

Figure 9:
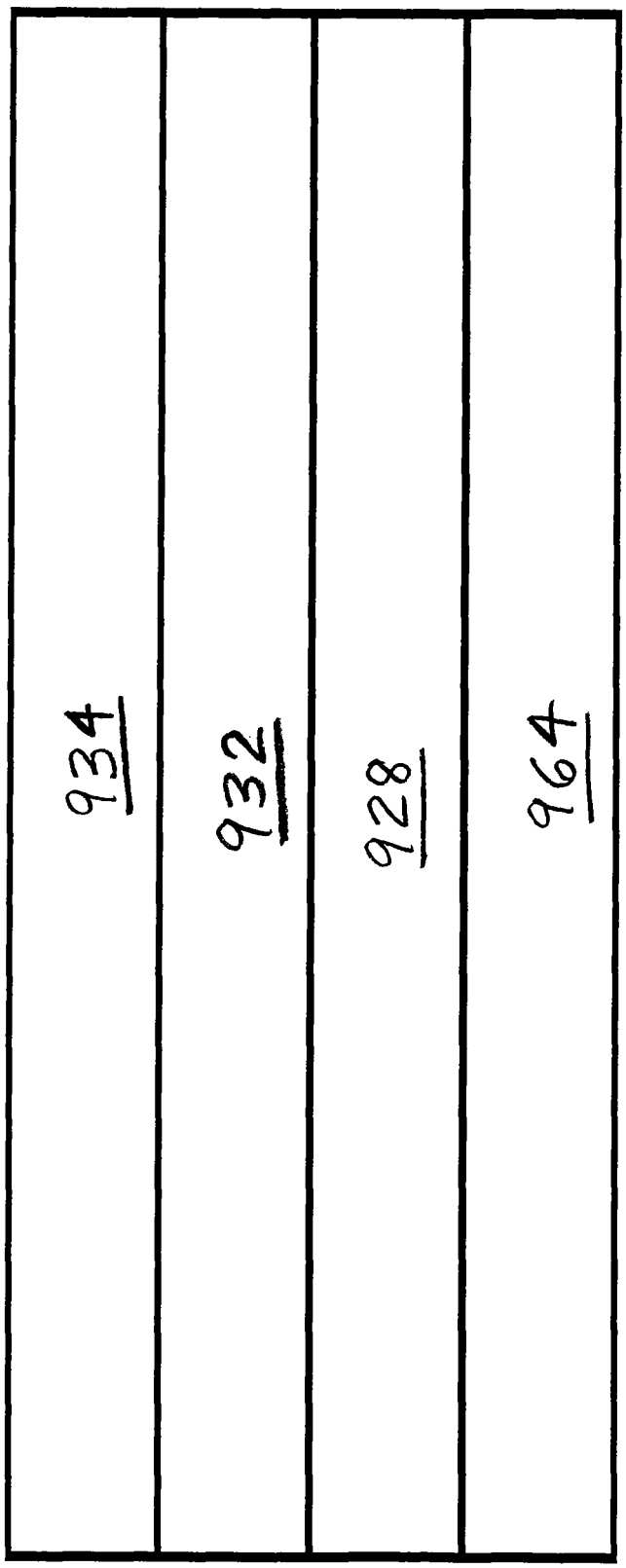
FIG. 9 is a side sectional view of a further embodiment of a bandage apparatus of the present invention.

In another embodiment, shown in FIG. 9, bandage 920 is in the form of a non-skid carrier/barrier with pressure sensitive adhesive and a silicone covering. Bandage 920 includes a substrate 928 which may be a non-woven polypropylene substrate. Substrate 928 may include a layer 932 of rubber-based pressure sensitive adhesive. A silicone "crack-and-peel" covering 934 protects adhesive layer 932. On the opposite side of substrate 928, which faces the ambient environment after installation, there is a 100% natural rubber non-skid coating 964.

Figure 10:
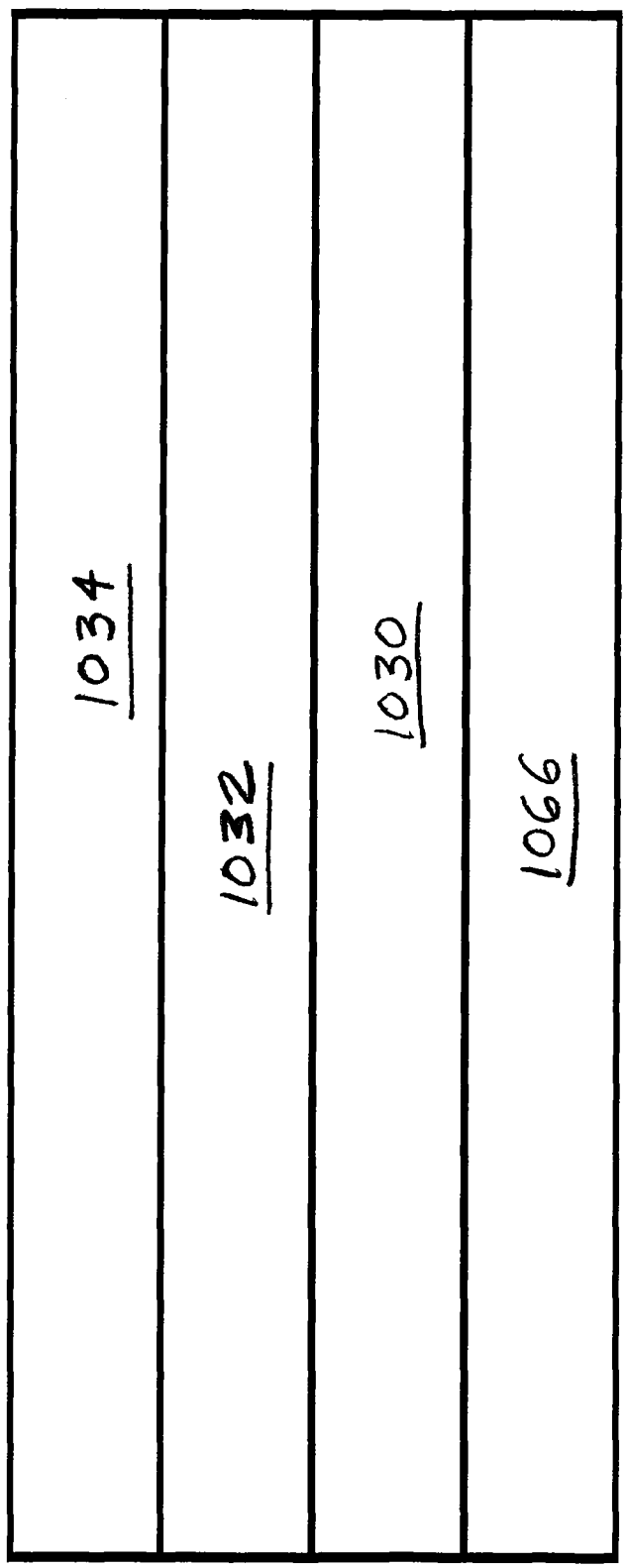
FIG. 10 is a side sectional view of another embodiment of a bandage apparatus of the present invention.

In another embodiment, shown in FIG. 10, bandage 1020 is in the form of a cushion carrier/barrier with pressure sensitive adhesive and a silicone covering. Bandage 1020 includes a cushioned substrate 1066 which may include a layer 1030 of coating or surface texturing to create a higher surface energy. Applied to layers 1066, 1030 may be a layer 1032 of rubber-based pressure sensitive adhesive. A silicone "crack-and-peel" covering 1034 protects adhesive layer 1032. Cushioned substrate 1066 may include a resilient foam material. With the protection provided by the cushioning, the bandage may have sufficient mechanical integrity to continue to encapsulate the toxins despite being bumped into by a sharp object that could otherwise puncture the substrate. In one embodiment, the foam is identical or similar to the foam or sealant material that is conventionally provided in self-sealing tires. In another embodiment, the resilient foam material is identical or similar to the material lining within the self-sealing tire that self-seals in the event of a small puncture hole being created.

In one embodiment, the bandage includes a five mil thick single layer polyester substrate possibly coated or textured on one side that is subsequently covered with a seven mil thick layer of pressure sensitive rubber based adhesive. The bandage may be constructed with different substrates that provide the full functionality of the invention along with an aesthetically pleasing appearance.

Figure 11:
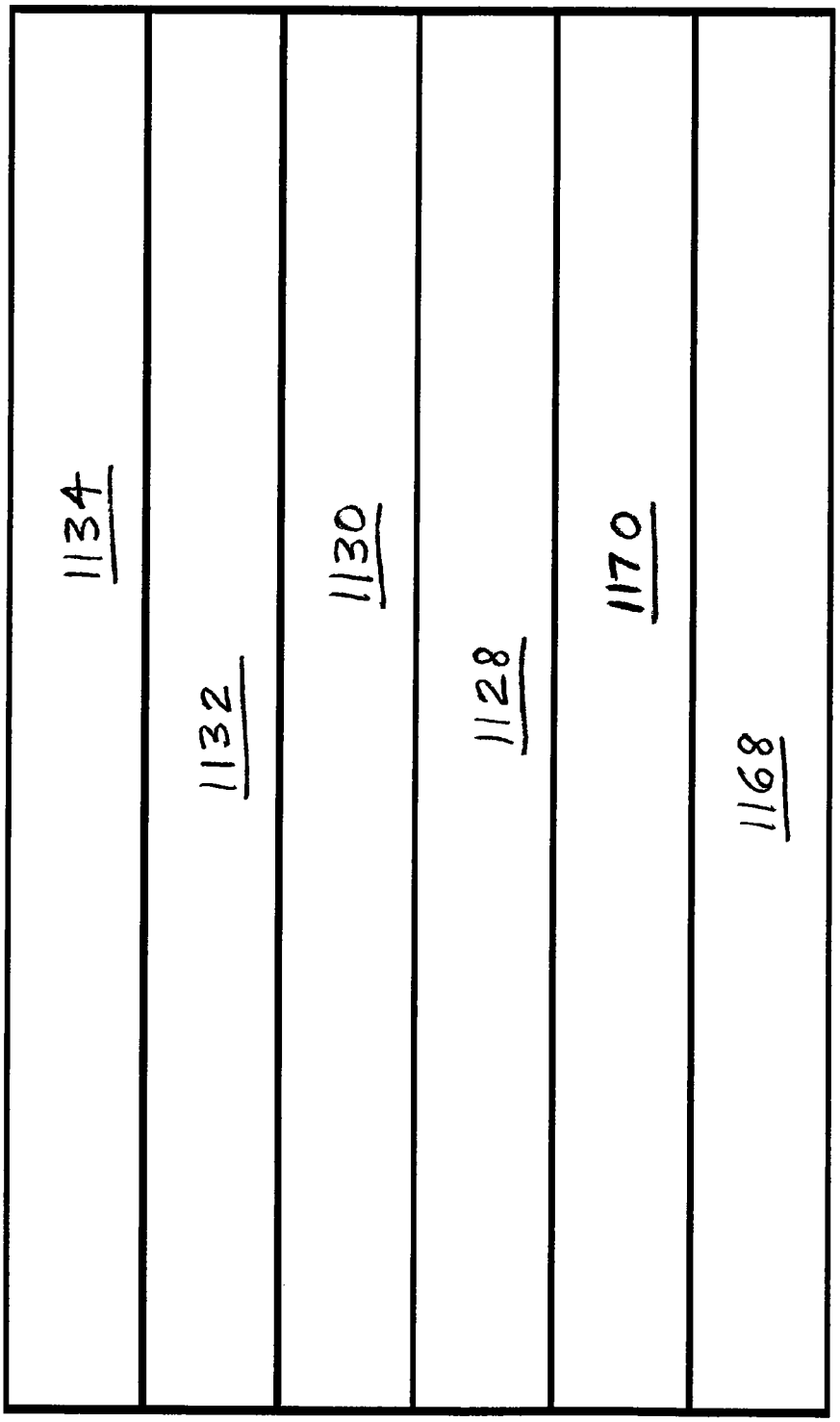
FIG. 11 is a side sectional view of yet another embodiment of a bandage apparatus of the present invention.

In another embodiment, shown in FIG. 11, bandage 1120 is in the form of a decorative carrier/barrier with pressure sensitive adhesive and a silicone covering. Bandage 1120 includes a decorative aesthetic covering 1168 which may include a layer 1170 of coating or surface texturing to create a higher surface energy. Applied to layers 1168, 1130 may be a substrate 1128 which may be an extruded polyester substrate. Substrate 1128 may include a layer 1130 of coating or surface texturing to create a higher surface energy. Applied to layers 1128, 1130 may be a layer 1132 of rubber-based pressure sensitive adhesive. A silicone "crack-and-peel" covering 1134 protects adhesive layer 1132.

In one embodiment, the bandage includes a five mil thick single layer polyester substrate possibly coated or textured on one side that is subsequently covered with a seven mil thick layer of pressure sensitive rubber based adhesive. The bandage may be constructed with different substrates that provide the full functionality of the invention along with a stable surface suitable for attaching coatings, adhesives or other construction materials during remediation.

In another embodiment, shown in FIG. 12, bandage 1220 is in the form of an adherable carrier/barrier with pressure sensitive adhesive and a silicone covering. Bandage 1220 includes a substrate 1228 which may be an extruded polyester substrate. Substrate 1228 may include a layer 1230 of coating or surface texturing to create a higher surface energy. Applied to layers 1128, 1130 may be a layer 1232 of rubber-based pressure sensitive adhesive. A silicone "crack-and-peel" covering 1234 protects adhesive layer 1232. Applied to the opposite side of substrate 1228 may be a layer 1270 of coating or surface texturing to create a higher surface energy. The exposed surface of layer 1270 is an adherable surface 1272 for attaching coatings, adhesives or other construction materials during remediation.

In any of the embodiments described above, the adhesive substance that is applied to the contaminated, toxin-bearing surface may include a fungicide for killing mold. In addition, or alternatively, the adhesive substance may include a chemical or other substance that neutralizes the particular toxin that is being covered by the bandage.

In any or all of the embodiments described above, the adhesive element may have particular characteristics that may enable it to encapsulate toxins effectively in the type of environments in which toxins typically exist (e.g., moist environments in the case of mold). Such particular characteristics of the adhesive may include:

1. Pressure sensitivity (e.g., a "pressure sensitive adhesive")
2. High level of initial tack. High initial tack may be beneficial in environments with toxic substances because a failure to secure the barrier initially would result in increased dispersion of the toxins, which may make the initial problem worse. A small number of rubber-based adhesives fill this requirement. However, most are designed to be inexpensive, and consequently they are thin and ineffective in the toxic environment. Those adhesives with acrylic coatings have low initial tack. Those adhesives with silicone coatings typically fall in the same category and are quite expensive.
3. Ability to adhere to a moist surface. Most tapes, while often designed to repel moisture, are not designed to stick to moist surfaces. In fact, almost all require the user to prepare the surface prior to adhering by cleaning and drying. This simply is not possible in a toxic, wet environment, particularly when time is of the essence.
4. Sufficient thickness to cover (e.g., engulf) all particles fully/completely and make full contact with the affected surfaces. Mold spores range in size from 1 to 100 microns, approximately the diameter of a hair. Add to that the irregularities of the surfaces and other particles present, and the thickness of adhesive needed on the inventive bandage may need to be greater than that on the typical masking tape, duct tape or clear packaging tape. The thickness of adhesive that has been determined to be effective is five mils or greater, which is approximately twice the average adhesive thickness used on commonly found tapes.
5. Viscosity that does not flow below 30,000 centipoises @ 250 degrees Fahrenheit. Put another way, the adhesive at this temperature would flow 30,000 times slower than water. This means the adhesive stands up to heat.
6. A minimum Mettler Drop Point of 180 degrees Fahrenheit. This means that at a minimum of 180 degrees Fahrenheit, the adhesive changes from a semi-solid to a liquid. Since some environments, including storage inside vehicles in hotter climates, can reach close to this temperature, it may be beneficial that the adhesives have an advanced level of stability that this measure reflects.
7. A melt point above 180 degrees Fahrenheit.
8. It must have a peel strength (PLI) of greater than eight pounds per linear inch. Peel strength is a measure of a material's ability to resist forces that can pull it apart by separating a flexible surface (e.g., the inventive bandage) from a rigid surface (the contaminated surface and toxins). As most common tapes (scotch, masking, duct) use a thin coating of adhesive, they are unable to achieve a higher peel strength and would typically reach a PLI of no greater than one to two pound per linear inch. Silicone tapes that are designed to be releasable fall below one pound per linear inch.

9. A shear failure at no less than 160 degrees Fahrenheit. Shear failure is when the viscosity of the adhesive reaches a point that it separates from itself. This measure is derived from applying external forces upon the material while subjected to rising temperatures. It is relevant in that when the inventive bandage is applied, it is likely to have a shearing force upon it from gravity and heat.

10. Flexibility at extremely low temperature such as 22 degrees below zero Fahrenheit.

An adhesive of the invention may have one or any combination of several or all of the above characteristics. A rubber-based adhesive may have the above characteristics/properties. This rubber-based adhesive may or may not be synthetic. While many rubber-based adhesives are marketed, most or all do not have the characteristics of the adhesive specified above, which may enable adhesion to low-surface energy products in wet conditions in a varied range of temperatures.

Other pressure sensitive adhesives such as acrylic adhesives have low initial tack and do not stick to moist surfaces adequately; whereas, silicone adhesives typically are for releasable applications.

It may be beneficial to have a relatively large volume of adhesive on the bandage in order to fully encapsulate toxin-laden surfaces. These surfaces may be wet, may have varying degrees of mold or toxins present, may be coated with dust or other loose particles and may be uneven. In order to fill the crevices on the surface, encapsulate toxins and ancillary sediments, the rubber-based adhesive may be applied in a thickness of no less than five mils and in some instances up to fifteen mils. According to the Pressure Sensitive Tape Council, an industry non-profit organization, the typical pressure sensitive adhesive coating is between two and three mils thick. The inventive bandage may have a significantly greater volume of adhesive in order to encapsulate toxins.

In any or all of the embodiments described above, the carrier/substrate may have particular beneficial characteristics that may enable it to encapsulate toxins effectively in the type of environments in which toxins typically exist (e.g., moist environments in the case of mold), and when used with an adhesive having the above characteristics. Such particular characteristics of the substrate may include:

1. Formed of a compound that maintains structural integrity in damp conditions.
2. Formed of a material that does not support mold growth, as would paper or a carrier constructed using a natural fiber base.
3. Non-metallic and non-conductive in order to avoid electrical safety hazards.
4. Non-porous to the extent that particles, in some instances as small as one-half a micron in diameter, may not permeate the carrier.
5. Thick enough that it does not collapse under the weight of the adhesive it supports.
6. Ability to withstand the same environmental conditions as the adhesive.
7. Non-reactive relative to the adhesive.

A substrate of the invention may have one or any combination of several or all of the above characteristics. In one embodiment, the substrate has a five mil thickness, and is an extruded, polyester substrate that has the above characteristics.

Common transfer tapes are designed to leave the adhesive on one surface for bonding to a second surface. While these tapes are manufactured using a wide spectrum of adhesives and release liners, they are not suitable or practical for encapsulating toxic substances.

Packaging tapes are designed specifically to apply to dry surfaces using cost effective thicknesses of adhesive. They are primarily manufactured using rubber-based adhesives with lower viscosities, thin layers of adhesive between one and three mils thick, and are unable to stick to wet surfaces. They are used for bag sealing, carton sealing, gift wrapping and as strapping tape. None would be suitable for encapsulating mold or other toxic substances.

Masking and surface protection tapes are designed specifically to apply to dry surfaces. They use a variety of adhesives including rubber-based, acrylic-based, silicone-based and other polymers. Masking tapes are designed to release in seven days or less. Some are used to provide UV stabilization for surfaces. None would be suitable for encapsulating mold or other toxic substances.

High bond tapes consist of transfer tapes, foam acrylics and heat activated tapes that create a high bond with the surface, however, each fail to meet the standard required for quick application with high initial tack in a moisture laden environment. None would be suitable for encapsulating mold or other toxic substances.

Foam tapes and gaskets are available in EPDM, Nitrile, Polyethylene, Polyurethane, PVC, Rubber, Silicone Sponge and Solid Silicone composition. All foams would be considered too porous for encapsulation. None are suitable for quick, complete encapsulation. The cost of most gasket type products would be considered high. None are manufactured in standard sizes that could be deemed large enough for use.

Most duct tapes are manufactured using a cloth carrier which would be a food source for mold. In addition, most duct tapes have a maximum of three mil thickness of rubber-based adhesive, but that adhesive does not have ability to be applied successfully to wet surfaces. In the HVAC foil duct tapes, the metal liner would be impermeable but would create a potential electrical hazard in the wet environments where mold grows. The cost of these tapes is prohibitive. It is doubtful if any would be suitable for encapsulating mold or other toxic substances. Also, these tapes come in much smaller widths than would be commercially viable for encapsulating large areas of toxins.

Specialty tapes are just that, tapes designed for specific purposes. They would include medical, electrical, plumbing and other purposes. For those products, just as for this product, a specific need was identified and products designed to fill that need.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of encapsulating a toxin on a contaminated surface, comprising the steps of:
   providing a plastic air-tight substrate having first and second opposing surfaces, an adhesive substance being disposed on the first surface, the substrate being transparent and tinted, the substrate being included in a group of said substrates, each of the substrates having a different color of tinting;

selecting one of the substrates that has a tint color that is visible against a color of the contaminated surface; and applying the first surface of the plastic substrate to the contaminated surface such that the plastic substrate is adhered to the contaminated surface, and such that the toxin is completely covered by the plastic substrate.

2. A method of encapsulating a toxin on a contaminated surface, comprising the steps of:

impregnating an adhesive substance with a fungicide;

providing a plastic air-tight substrate having first and second opposing surfaces, the adhesive substance being disposed on the first surface; and applying the first surface of the plastic substrate to the contaminated surface such that the plastic substrate is adhered to the contaminated surface, and such that the toxin is completely covered by the plastic substrate.

3. A method of encapsulating a toxin on a contaminated planar surface, comprising the steps of:

attaching a frame to the planar surface such that the frame substantially surrounds the toxin;

providing a plastic air-tight substrate having first and second opposing surfaces, an adhesive substance being disposed on the first surface; and applying opposite ends of the first surface of the plastic substrate to respective opposing portions of the frame such that the toxin is encapsulated between the planar surface, the frame, and the plastic substrate.

4. The method of claim 3, wherein the planar surface is a surface of a piece of drywall, the method comprising the further steps of:

cutting through the drywall around an entire perimeter of the frame to thereby disconnect the contaminated portion of the piece of drywall from a remainder of the piece of drywall; and removing and disposing of the contaminated portion of the piece of drywall with the frame and plastic substrate attached thereto.

5. The method of claim 3, comprising the further step of adhering the first surface of the plastic substrate to the contaminated planar surface that is surrounded by the frame.

6. The method of claim 3, wherein the plastic substrate is provided in a plurality of elongate strips, the applying step comprising applying the elongate strips to the frame in a side-by-side relationship such that adjacent side edges of adjacent said strips overlap each other.

7. A method of encapsulating a toxin on a piece of drywall, comprising the steps of:

attaching a frame to the piece of drywall such that the frame substantially surrounds the toxin;

providing a flexible substrate having first and second opposing surfaces, an adhesive substance being disposed on the first surface;

applying opposite ends of the first surface of the flexible substrate to respective opposing portions of the frame such that the toxin is encapsulated between the piece of drywall, the frame, and the flexible substrate;

cutting through the piece of drywall around an entire perimeter of the frame to thereby disconnect a portion of the piece of drywall from a remainder of the piece of drywall, the toxin being on the portion of the piece of drywall; and removing and disposing of the portion of the piece of drywall with the frame and flexible substrate attached thereto.

8. The method of claim 7, comprising the further step of adhering the first surface of the flexible substrate to the portion of the piece of drywall that is surrounded by the frame.

9. The method of claim 7, wherein the flexible substrate is provided in a plurality of elongate strips, the applying step comprising applying the elongate strips to the frame in a side-by-side relationship such that adjacent side edges of adjacent said strips overlap each other.

10. The method of claim 7, wherein the flexible substrate comprises a plastic flexible substrate.

11. The method of claim 7, wherein the flexible substrate comprises an airtight flexible substrate.

12. The method of claim 7, wherein the substrate is wound up on a roll, the applying step comprising dispensing the substrate from the roll.

13. The method of claim 12, wherein the roll is perforated in directions perpendicular to a length of the substrate, the perforations being substantially equally-spaced at locations along the length of the substrate, the applying step comprising breaking the perforations at a selected one of the locations such that the broken off section of the substrate has a length slightly larger than a distance between the respective opposing portions of the frame.

14. The method of claim 13, comprising the further steps of:

breaking the perforations at a second selected one of the locations to thereby form a second broken off section; and applying the second broken off section adjacent to, and partially overlapping, the first broken off section on the frame.

15. The method of claim 7, wherein the substrate is transparent and tinted, the substrate being included in a group of said substrates, each of the substrates having a different color of tinting, the method comprising the further step of selecting one of the substrates that has a tint color that is visible against a color of the contaminated surface.

* * * * *